United States Patent [19]
Sobel et al.

[11] 4,250,131

[45] * Feb. 10, 1981

[54] REFRACTORY INORGANIC OXIDE FIBERS

[75] Inventors: Jay E. Sobel, Des Plaines, Ill.; Vincent T. Brand, Madison, Wis.

[73] Assignee: UOP Inc., Des Plaines, Ill.

[*] Notice: The portion of the term of this patent subsequent to Oct. 10, 1993, has been disclaimed.

[21] Appl. No.: 3,560

[22] Filed: Jan. 15, 1979

Related U.S. Application Data

[63] Continuation of Ser. No. 307,733, Nov. 17, 1972, abandoned, which is a continuation of Ser. No. 144,296, May 17, 1971, abandoned, which is a continuation-in-part of Ser. No. 787,607, Dec. 27, 1968, abandoned.

[51] Int. Cl.³ .............................................. B28B 3/26
[52] U.S. Cl. ........................... 264/56; 264/DIG. 19; 264/65; 264/66; 264/176 F
[58] Field of Search ................ 264/66, 176 F, 56, 55, 264/59, 65, 24, 63, DIG. 19; 106/62, 65

[56] References Cited

U.S. PATENT DOCUMENTS

| | | | |
|---|---|---|---|
| 2,908,545 | 10/1959 | Teja | 264/63 |
| 3,227,792 | 1/1966 | Rosenthal | 264/203 |
| 3,324,061 | 6/1967 | Tanquary et al. | 264/205 |
| 3,503,765 | 3/1970 | Blaze | 106/65 |
| 3,529,044 | 9/1970 | Santangello | 264/29.2 |
| 3,652,749 | 3/1972 | Sobel et al. | 264/63 |

*Primary Examiner*—Donald J. Arnold
*Attorney, Agent, or Firm*—James R. Hoatson, Jr.; Robert W. Welch; William H. Page, II

[57] ABSTRACT

A method of preparing refractory inorganic oxide fibers. A substantially liquid phase reaction mixture is formed consisting essentially of an inorganic oxide sol, e.g., an alumina sol, and a soluble, fiber-forming organic polymer, e.g., polyethylene oxide. The reaction mixture is concentrated, drawn into fibers and calcined.

5 Claims, No Drawings

REFRACTORY INORGANIC OXIDE FIBERS

This is a continuation of application Ser. No. 307,733, filed Nov. 17, 1972, now abandoned, which is in turn a continuation of Ser. No. 144,296, filed May 17, 1971, now abandoned, which in turn a continuation-in-part of application Ser. No. 787,607 filed Dec. 27, 1968, now abandoned.

BACKGROUND OF THE INVENTION

This invention relates to a method of preparing refractory inorganic oxide fibers. Such fibers have heretofore been recognized as insulators against heat and sound, and as fillers stiffening agents or tensile and abrasion reinforcing agents for plastics, films, and the like. The refractory inorganic oxide fibers of this invention are flexible fibers capable of being formed into multiple filament yarns and flexible textiles and mats. They are characterized as porous fibers of high surface area and are advantageously employed as a catalyst, or a catalyst support, for a variety of reactions including hydrocarbon conversion reactions and, in particular, the treatment of combustible waste gases prior to discharge of the same into the atmosphere. For example, the fibers of this invention are particularly adapted for incorporation in a catalytic muffler as a catalyst or component thereof to effect the elimination of products of incomplete combustion from hydrocarbonaceous waste gases eminating from an internal combustion engine prior to discharge to the atmosphere.

It is an object of this invention to provide a novel method of preparing refractory inorganic oxide fibers whereby porous flexible fibers of high surface area, capable of functioning as a catalyst or a component thereof, are produced.

SUMMARY OF THE INVENTION

In one of its broad aspects, the present invention embodies a method of preparing refractory inorganic oxide fibers which comprises preparing a sol by effecting a reduction in the acid anion concentration of an aqueous solution of a hydrolyzable acid salt of a metal selected from the group consisting of aluminum, chromium, zirconium, silicon and titanium; admixing therewith a fiber-forming organic polymer which is soluble in said sol, and forming a substantially liquid phase mixture, said organic polymer comprising from about 0.5 to about 25 wt. % of said mixture; concentrating the mixture to a viscosity of from about 1 to about 20,000 poise; and thereafter drawing the mixture into fibers in an atmosphere characterized by a relative humidity of less than 80% and a temperature of from about 5° to about 90° C., and calcining the resulting fibers in air.

Other objects and embodiments of this invention will become apparent in the following detailed specification.

The refractory sols herein contemplated include those gellable hydrous sols which, upon gelation and subsequent calcination, are converted to a refractory inorganic oxide, for example, alumina, chromia, zirconia, silica, titania, etc., as well as combinations thereof including alumina-chromia. The sols utilized as a starting material in accordance with the method of this invention comprise inorganic polymeric particles of colloidal dimension suspended in an aqueous media. The sols are such as are prepared by the hydrolysis of an appropriate metal acid salt in aqueous solution, for example an acid salt of aluminum, chromium, zirconium, silicon, titanium, etc., followed by a reduction in concentration of the acid anion whereby organic polymers of colloidal dimension are formed suspended in the remaining liquid. The resulting sols are somewhat tacky, the degree of tackiness being a function of metals concentration, metals/acid anion ratio, and the extent to which polymerization is allowed to occur. While the sols herein contemplated are themselves a fiberizable material, the resulting filaments are typically of limited length, comparatively brittle, and of relatively low surface area.

For the purpose of illustrating the present method of preparation, the further description is presented with reference to the preparation of alumina fibers. However, it is understood that the method of this invention is also applicable to the preparation of improved fibers comprising other refractory inorganic oxides or combinations thereof. Thus, the alumina sols can be prepared by the hydrolysis of a suitable acid salt of aluminum such as aluminum chloride, aluminum sulfate, aluminum nitrate, aluminum acetate, etc., in aqueous solution, and treating said solution at conditions to reduce the acid anion concentration, e.g. chloride anion concentration. Reduction of the acid anion concentration can be accomplished in any conventional or otherwise convenient manner. For example, an aluminum salt solution, such as an aqueous aluminum chloride solution, can be subjected to electrolysis utilizing an electrolytic cell with a porous partition between the anode and cathode whereby an anion deficient alumina sol is recovered from the cathode compartment. In some cases, as in the case of aluminum acetate, where the acid anion is sufficiently volatile, the desired reduction in anion concentration can be effected simply by heating. A particularly suitable method is in the use of aluminum metal as a neutralizing agent in conjunction with, for example, an aluminum chloride solution. In this instance, the salt of neutralization is itself a hydrolyzable aluminum salt subject to ultimate polymerization and sol formation.

One preferred method of sol preparation comprises digesting aluminum pellets or slugs in aqueous hydrochloric acid and/or aluminum chloride solution—usually at about reflux temperature—utilizing an excess of aluminum metal. The described sols, conveniently referred to as aluminum chloride sols, are preferably prepared to contain less than about 14 wt. % aluminum, preferably from about 12 to 14 wt. %, with an aluminum/chloride atom ratio of from about 1:1 to about 2:1. Generally, such sols will contain from about 8 to about 12 wt. % chloride.

Pursuant to the method of this invention, a fiber-forming, organic polymer which is soluble in the sol is admixed with the sol to form a substantially liquid phase reaction mixture. The selected organic polymer must be substantially stable at fiberizing conditions, i.e., a temperature of from about 5° to about 90° C. The soluble, fiber-forming, organic polymers herein contemplated include the modified natural products prepared as water-soluble derivatives of naturally occurring, fiber-forming, organic polymers or resins. Thus, the soluble, fiber-forming, organic polymer can be a starch derivative such as starch acetate, hydroxyethyl starch ether, amine starches, etc., or a soluble cellulose derivative, for example, the alkyl and hydroxyalkyl cellulose derivatives like methylcellulose, ethylcellulose, ethyl methylcellulose, hydroxyethylcellulose, hydroxyethyl methylcellulose, hydroxpropyl methykcellulose, ethyl hydroxyethylcellulose, etc., and also water-soluble derivatives such as carboxymethylcellulose, carboxymethyl hydroxyethylcellulose, and the like. Preferably, the soluble, fiber-forming, organic polymer is a synthetic product such as the soluble polyalcohols, ployacids, polyethers, polyimines and polyamides, derived from a variety of synthetic monomers. Suitable synthetic organic polymers include the soluble polyvinyl alcohols, polyurethanes, polyacrylic acid salts, polyacrylamides, polyvinyl methyl ethers, polyvinylpyrrolidones, polyethylene oxides, and the like. Since the organic polymer is expended in the fiber-making process, it is desirable to utilize a minimum amount commensurate with a desired fiber product quality. Suitably, the organic polymer may comprise from about 0.5 to about 25 wt. % of the reaction mixture although larger amounts can be used. The inclusion of a soluble, fiber-forming, organic polymer in the sol imparts an added cohesiveness thereto which enables the sol to be drawn or stretched into longer, finer fibers or filaments of an orderly molecular arrangement or orientation before the sol sets to a gel. The end result is upon subsequent calcination, a refractory inorganic oxide fiber of improved strength and flexibility.

The reaction mixture thus prepared is concentrated to a tacky consistency while maintaining a substantially liquid phase. The reaction mixture is suitably reduced to the desired consistency by the evaporation of water therefrom, suitably by simple evaporation upon standing or upon stirring in an open vessel, but more conveniently by treating in a vacuum evaporator at ambient temperature, a tacky consistency being achieved at a viscosity of from about 1 to about 20,000 poise. The further evaporation of water and initial gelation of the sol is effected as the concentrated reaction mixture is being drawn into stable fibers in an atmosphere of controlled temperature and humidity.

Fiberizing conditions relate principally to the temperature and humidity of the environment in which the fibers are formed. The relatively large surface area presented by the fibers in the process of being formed permits a relatively rapid evaporation of moisture therefrom with the formation of a stable fibrous hydrogel, provided that the moisture content of the environment is sufficiently low. If, however, the moisture is too high, the desired rapid evaporation does not occur and the fibrous hydrosol may in effect absorb sufficient moisture to collapse in a formless mass. The fiberizing environment should comprise a relative humidity of less than about 80%, and preferably from about 10% for extrusion spinning. The temperature of the fiberizing environment is somewhat less critical and may be from about 5° to about 90° C., and preferably from about 25° to about 90° C. The described reaction mixture may be processed or formed into fibers by a slow and constant injection of the concentrated reaction mixture into the atmosphere of controlled humidity and temperature, drawing the injected mixture into fibers and subjecting the fibers thus formed to a specific heat treatment to yield a porous, flexible product. The reaction mixture may be extruded or passed through a perforated plate comprising one or more relatively large orifice openings, the resulting fibers being rapidly attenuated using the material being extruded or pulled through the perforated plate as a constant feed. In any case, the reaction mixture is preferably drawn or extruded into fibers with a maximum diameter of less than about 20 microns for improved flexibility.

The fibers thus formed are thereafter calcined at a temperature of at least about 300° C., and preferably from about 300° C. to about 1000° C., in an air atmosphere, whereby the organic matter is burned from the fibers and a flexible refractory inorganic oxide product is recovered. As will be apparent with reference to the appended examples, the incorporation of a soluble, fiber-forming, organic polymer in the sol subsequently processed into fibers, results in a yield of porous flexible fibers.

In summary, one preferred embodiment of the present invention relates to a method of preparing alumina fibers which comprises preparing an alumina sol by effecting a reduction in the chloride anion concentration of an aqueous aluminum chloride solution, said sol containing from about 12 to about 14 wt. % aluminum in from about 1:1 to about a 2:1 atom ratio with the chloride content thereof; admixing a soluble polyethylene oxide polymer therewith and forming a substantially liquid phase mixture, said polymer comprising from about 0.5 to about 25 wt. % of said mixture; concentrating the mixture to a viscosity of from about 1 to about 20,000 poise; and thereafter drawing the concentrated mixture into fibers in an atmosphere characterized by a relative humidity of from about 30% to about 60% and a temperature of from about 25° to about 90° C., and calcining the resulting fibers in air at a temperature of from about 300° to about 1000° C.

The following examples are presented in illustration of the method of this invention and are not intended as an undue limitation of the generally broad scope of the invention as set out in the appended claims.

EXAMPLE I

An alumina sol was prepared by digesting an excess of aluminum metal in aqueous hydrochloric acid under reflux conditions (98°–115° C.). The sol analyzed 12.49% aluminum, 10.75% chloride and had a specific gravity of 1.3630. To 67.0 grams of the sol was added, with stirring, 80 grams of a 5 wt. % aqueous polyurethane solution. The reaction mixture was concentrated by the evaporation of water therefrom while maintaining substantially liquid phase conditions. The concentrated reaction mixture was drawn into fibers in an atmosphere characterized by relative humidity of 45–55% and a temperature of 20°–30° C. The organic matter was burned from the fibers and the fibers calcined for about 1 hour at a temperature of 550° C. in air. The mean diameter of the calcined fibers was about 4 microns. Measurement of surface area properties by nitrogen absorption indicated a surface area of 100 square meters per gram, a pore volume of 0.14 cubic centimeters per gram and a pore diameter of 56 Å. The fibers were very flexible and resilient.

EXAMPLE II

To 90 grams of alumina sol, substantially as described in Example I, was added with stirring, 100 grams of 10 wt. % aqueous polyethylene oxide solution. The polyethylene oxide was Union Carbide's "polyox" and had an average molecular weight of about 200,000. The reaction mixture was concentrated while maintaining substantially liquid phase conditions and drawn into fibers in an atmosphere characterized by a relative humidity of 45–55% and a temperature of 20°–30° C. The organic matter was burned from the fibers and the fibers calcined for about 1 hour at a temperature of 550° C. in air. The mean diameter of the fibers was about 3 microns. The fibers were very flexible and resilient and had a surface area of about 298 square meters per gram, a pore volume of 0.3 cubic centimeters per gram and a pore diameter of 43 Å.

EXAMPLE III

A chromia-alumina sol was prepared by digesting aluminum metal in aqueous chromium chloride solution. The sol analyzed 10.02% aluminum, 2.87% chromium and 10.14% chloride. The specific gravity of the sol was 1.349. To 118.7 grams of the sol was added, with stirring, 6.2 grams of polyvinylpyrrolidone having an average molecular weight of about 40,000. The reaction mixture was concentrated by the evaporation of water therefrom while maintaining substantially liquid phase conditions. The concentrated reaction mixture was drawn into fibers in an atmosphere characterized by a relative humidity of 45–55% at a temperature of 20°–30° C. The organic matter was burned from the fibers and the fibers calcined at a temperature of about 550° C. in air. The mean diameter of the calcined fibers measured 6 microns. Measurement of surface properties by nitrogen absorption indicated a surface area of 327 square meters per gram, a pore volume of 0.23 cubic centimeters per gram and a pore diameter of 28 Å. The fibers were very flexible and resilient.

EXAMPLE IV

To 69.3 grams of the chromia-alumina sol, substantially as described in Example III, was added, with stirring, 18.0 grams of a 5 wt. % aqueous polyurethane solution. The reaction mixture was concentrated by the evaporation of water therefrom while maintaining substantially liquid phase conditions. The concentrated reaction mixture was drawn into fibers in an atmosphere characterized by a relative humidity of 45–55% and a temperature of 20°–30° C. The fibers were heated and the organic matter burned therefrom at a calcination temperature of about 550° C. The calcined fibers were very flexible and resilient and had a mean diameter of about 6 microns. Measurement of surface area properties by nitrogen absorption indicated a surface area of 210 square meters per gram, a pore volume of 0.15 cubic centimeters per gram and a pore diameter of 29 Å.

We claim as our invention:
1. A method of preparing alumina fibers by the sequential steps of:
    (a) preparing a spinning solution consisting essentially of a fiberizable alumina sol by effecting a reduction in the acid anion concentration of an aqueous solution of a hydrolyzable acid salt of aluminum;
    (b) admixing therewith a fiber-forming organic polymer consisting essentially of fiber-forming organic polymers which are soluble in said sol and which are selected from the group consisting of polyurethane, polyethylene oxide and polyvinyl pyrrolidone, to form a substantially liquid phase mixture, said organic polymer comprising from about 0.5 to about 25 wt. % of said mixture;
    (c) concentrating said mixture to a viscosity of from about 1 to about 20,000 poise; and
    (d) thereafter drawing the concentrated mixture into fibers in an atmosphere characterized by a humidity of less than about 80% and a temperature of from about 5° to about 90° C., and calcining the resulting fibers in air at a temperature of from about 300° C. to about 1000° C.
2. The method of claim 1 further characterized in that said sol is an aluminum chloride sol prepared by effecting a reduction in the chloride anion concentration of an aqueous aluminum chloride solution, said sol containing from less than about 14 wt. % aluminum in from about 1:1 to about a 2:1 atom ratio with the chloride content thereof.
3. The method of claim 2 further characterized in that said aluminum sol contains from about 12 to about 14 wt. % aluminum.
4. The method of claim 1 further characterized in that said concentrated mixture is drawn into fibers in an atmosphere characterized by a relative humidity of less than about 10% and a temperature of from about 25° to about 90° C.
5. The method of claim 1 further characterized in that said organic polymer is a soluble polyethylene oxide.

* * * * *

UNITED STATES PATENT AND TRADEMARK OFFICE
CERTIFICATE OF CORRECTION

PATENT NO. : 4,250,131
DATED : February 10, 1981
INVENTOR(S) : Jay E. Sobel et al.

It is certified that error appears in the above—identified patent and that said Letters Patent is hereby corrected as shown below:

On the title page the [*] Notice: should read

-- That portion of the term of this patent subsequent to Sept. 10, 1993 has been disclaimed. --

*Signed and Sealed this*

*Nineteenth* Day of *May 1981*

[SEAL]

Attest:

RENE D. TEGTMEYER

*Attesting Officer*    *Acting Commissioner of Patents and Trademarks*